INVENTOR:
MARTIN G. GABRIEL
ATTORNEYS.

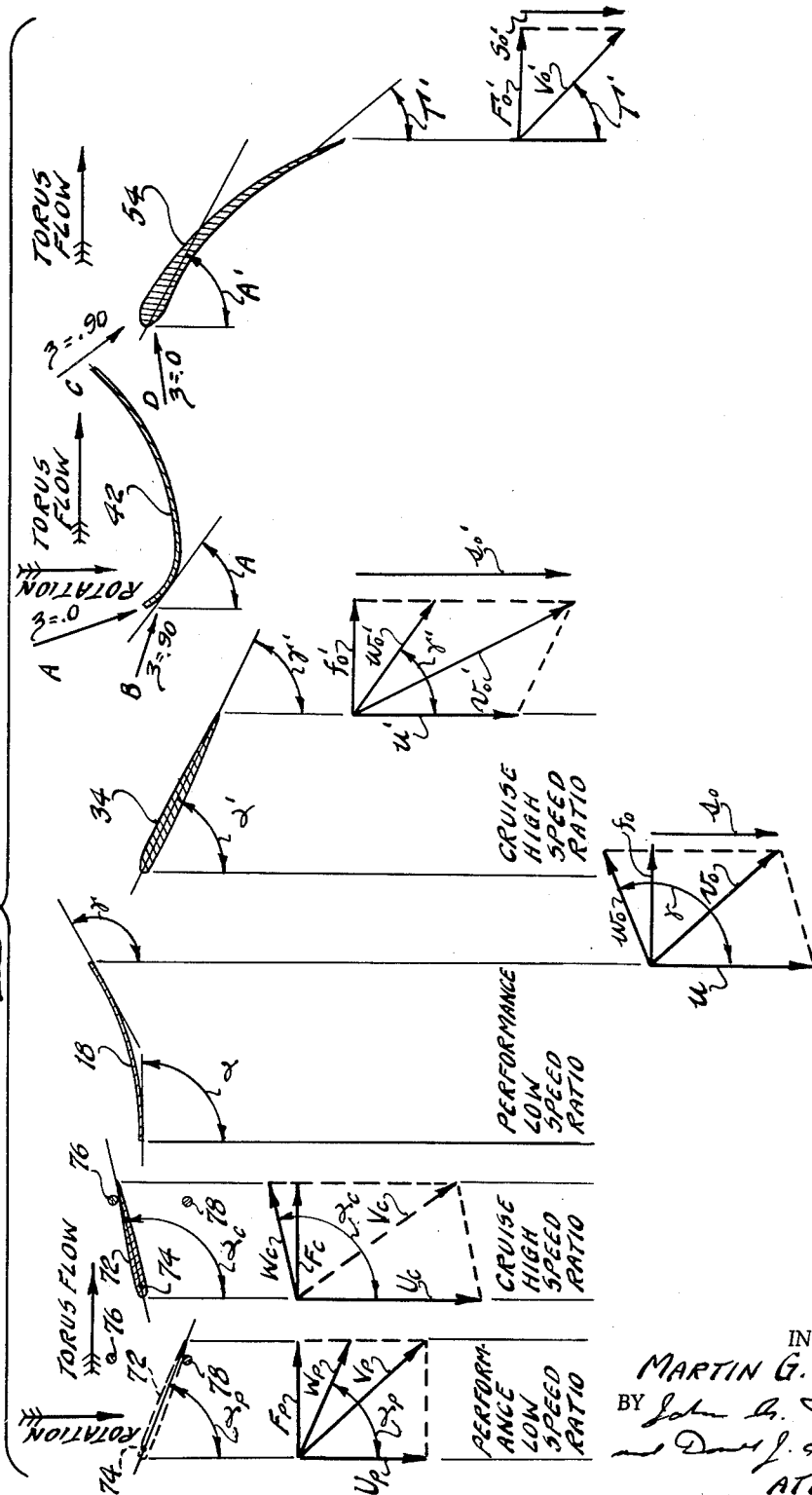

United States Patent Office 3,238,727
Patented Mar. 8, 1966

3,238,727
HYDROKINETIC TORQUE CONVERTER MECHANISM WITH AUXILIARY IMPELLER
Martin G. Gabriel, Dearborn, Mich., assignor to Ford Motor Company, Dearborn, Mich., a corporation of Delaware
Filed May 27, 1963, Ser. No. 283,227
7 Claims. (Cl. 60—54)

My invention relates generally to hydrokinetic torque converter mechanisms, and more particularly to a torque converter mechanism having a compound impeller with multiple bladed sections, the blades of each section being of a geometry that differs from the corresponding geometry of the blades of the adjacent section. I contemplate that the relative motion of the bladed sections can be controlled selectively so that the tangential component of the absolute fluid flow velocity vector for the torus flow associated with the impeller can be controlled to produce varying torque converter characteristics.

In a preferred form of my invention, I have provided a torque converter impeller having a main section and an auxiliary section located at its fluid flow exit. Another auxiliary impeller section is connected to the first auxiliary section and is located at the fluid entrance of the main impeller section. Clutch means are provided for connecting together all of the impeller sections for rotation in unison during operation in a first performance range. The two auxiliary sections can be released from the main impeller section during operation in a second performance range.

The clutch structure associated with the impeller assembly can be cotnrolled to establish optimum converter characteristics during high performance low speed ratio operation and to provide maximum efficiency during cruising opeartion at high speed ratios.

The provision of a torque converter mechanism of the type set forth being a principal object of my invention, it is a further object of my invention to provide an improved clutch structure that is located within the inner region of the converter assembly for clutching and releasing the auxiliary impeller sections with respect to the main impeller section.

It is a further object of my invention to provide a hydrokinetic torque converter mechanism wherein the effective blade length of the impeller assembly of the mechanism can be increased to a desirable maximum value, and wherein the effective operating diameter of the impeller assembly can be increased during cruising performance to provide maximum operating efficiency.

It is a further object of my invention to provide a hydrokinetic torque converter mechanism, having multiple bladed impeller sections wherein provision is made for locking together the impeller sections for rotation in unison during cruising performance and for releasing the impeller sections for relative free-wheeling motion during operation in a high performance low speed ratio range. In this way it is possible to eliminate an undesirable gap in the torus flow circuit during cruising performance when high operating efficiency is desired.

It is a further object of my invention to provide a hydrokinetic torque converter mechanism having a main section and auxiliary sections located at the exit region and the entrance region of the main impeller section, and wherein the auxiliary sections, during operation in the performance range, rotate at a slower speed than the main impeller section.

It is a further object of my invention to provide a mechanism as set forth in the preceding object wherein the improved clutch mechanism provides a supporting bearing for the auxiliary impeller sections.

For the purpose of describing more particularly the improvements of my invention, reference will be made to the accompanying drawings, wherein:

FIGURE 2 is a schematic vector diagram that describes the characteristics of the fluid flow in the torus circuit for the construction of FIGURE 1;

Figure 1:
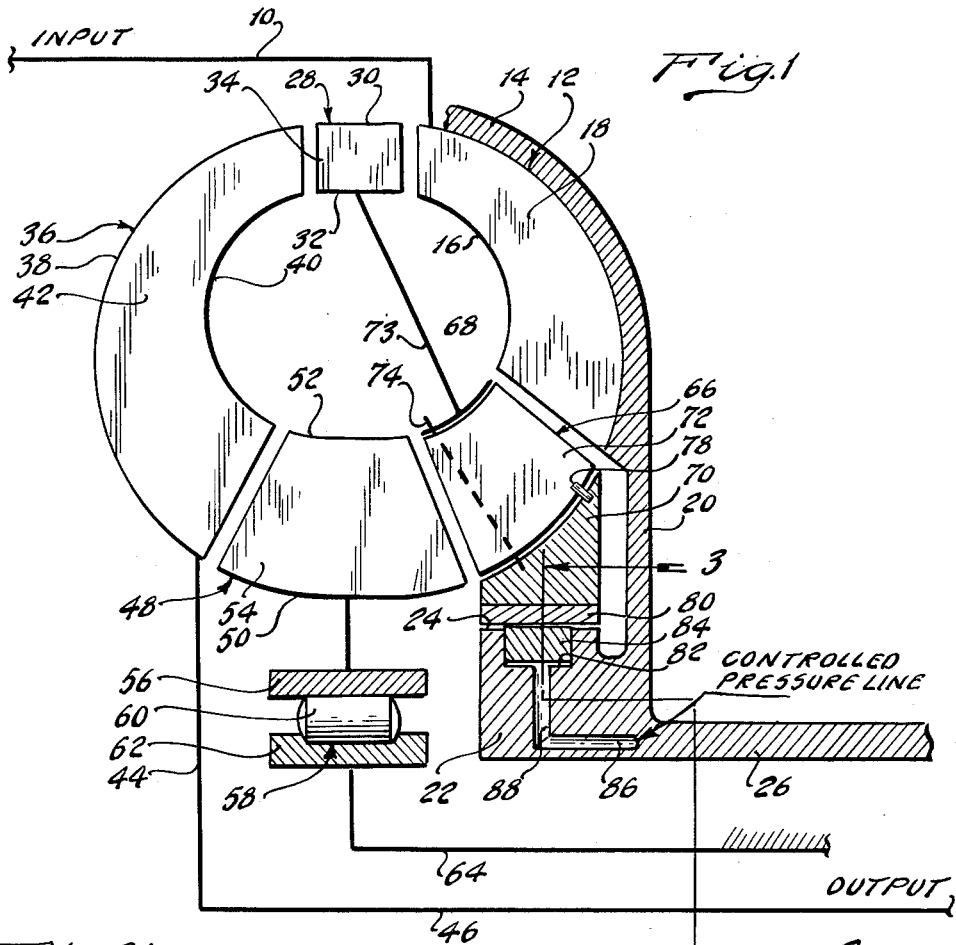
FIGURE 1 shows in schematic form a longitudinal cross-sectional view along section line 1—1 of FIGURE 3 showing a torque converter embodying the improvements of my invention.

Referring first to FIGURE 1, reference character 10 indicates a power input drum which may be connected drivably to the crankshaft of an internal combustion vehicle engine. Numeral 12 generally indicates a torque converter impeller which includes an outer shell 14 and an inner shroud 16. Located between the shell 14 and the shroud 16 are main impeller blades 18.

The shell 14 is formed with a toroidal shape and its hub 20 is provided with a boss 22 about which is formed a cylindrical bearing surface 24. Hub 20 includes a shaft extension 26 which in turn can be journalled in a conventional fashion within a stationary transmission housing, not shown.

Situated at the flow exit region of the main impeller blades is an auxiliary impeller 28 having an outer shroud 30 and an inner shroud 32. Disposed between the shrouds 30 and 32 are blades 34. These blades define flow passages that form continuations of the passages defined by the radial outflow blades 18.

A turbine member is generally indicated by reference character 36. It includes an outer shroud 38 and an inner shroud 40. Turbine blades 42 are situated between the shrouds, and they define radial inflow passages.

The outer shroud 38 is connected by means of a hub member 44 to a turbine driven output shaft 46. This shaft in turn may be connected to a power input element of a transmission gear assembly, the output element of which can be connected to the traction wheels for the wheeled vehicle through a suitable driveline.

Situated at the exit region of the turbine blades 42 is a stator 48. This stator includes a shroud 50, a second shroud 52 and stator blades 54 situated between the shrouds. Shroud 50 is connected to an outer race 56 of an overrunning coupling 58. Coupling 58 includes rollers 60 situated between race 56 and an inner race 62. One of the races can be cammed to provided cammed surfaces which cooperate with the rollers 60 to inhibit rotation of stator 48 in one direction while permitting free-wheeling motion thereof in the opposite direction. The race 62 is connected to a stationary stator shaft 64 which in turn may be connected to the stationary transmission housing in a conventional fashion.

Situated between the flow exit section of the stator blades 54 and the flow entrance region of the main impeller blades 18 is another auxiliary impeller section 66. It includes an outer shroud 68, and an inner shroud 70 in the form of a hub. Disposed between the shrouds are auxiliary impeller blades 72. Each blade 72 is mounted upon a pivot shaft 74 which in turn is pivotally supported by the hub 70 and the shroud 68. Shroud 68 is connected to inner shroud 32 of the first auxiliary impeller by means of a web member 73.

The blades 72 can be adjustably positioned about the axes of shafts 74 so that they will assume either one angular position or another. These positions are defined by stops carried by the hub 70. These stops are identified in FIGURE 2 by reference characters 76 and 78.

The inner periphery of hub 70 defines a bearing ring 80 which encircles the surface 24. A minimum amount of diametral clearance, possibly .002″, is provided between the surface of bearing ring 80 and the surface 24.

A recess 82 is formed in the boss 22. Situated within the recess is a pressure pad 84. The axial width of pad 84 is substantially the same as the width of its recess 82.

The radially inward region of recess 82 communicates with a presure passage 86 through a radial passage 88. Passage 86 in turn may communicate with a fluid pressure source through an automatic pressure distributor control valve system, not shown.

When pressure is introduced into the recess 82, the pressure pad 84 will be urged into engagement with the bearing ring 80. This will tend to shift the hub 70 in a transverse direction with respect to the axis of the torque converter unit. This will cause a frictional engagement of the ring 80 and the surface 24. The region of contact between the surface 24 and the ring 80 will be 180° out of phase with respect to the point of application of the hydraulic pressure. In this way, the auxiliary impeller sections can be clutched to the main impeller shell so that the entire assembly rotates in unison.

Figures 3, 3A:
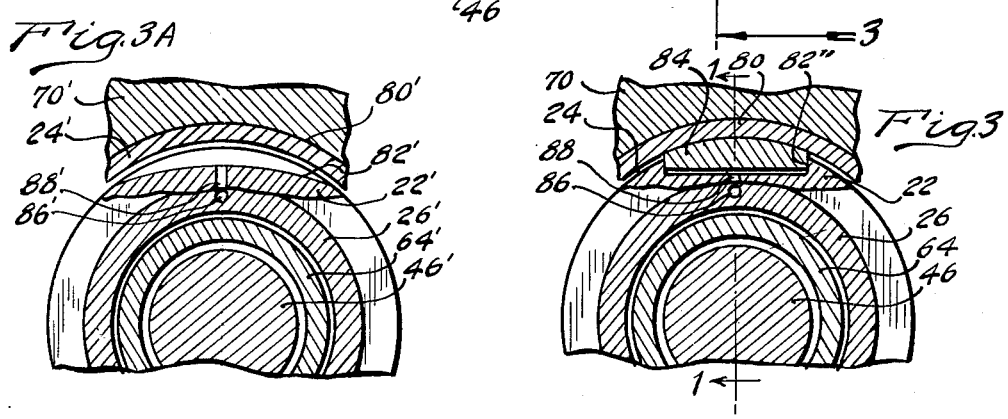
FIGURE 3 is a cross-sectional view taken along section line 3—3 of FIGURE 1.
FIGURE 3A is a modified form of the structure of FIGURE 3.

In the embodiment of FIGURE 3A, the elements have been identified by reference numerals that correspond to counterpart elements shown in FIGURE 3 although prime notations have been added. Recess 82′ does not receive a shoe, so the hydrostatic pressure distributed thereto is developed by reason of the restriction provided by the minimum clearance between ring 80′ and shaft 64′.

When the pressure pad is loaded with hydraulic pressure or when recess 82′ is pressurized, the auxiliary impeller hub will shift by reason of the clearance that is provided between the impeller boss and the bearing ring. The clutch is thus engaged. In the case of the embodiment of FIGURE 3A, fluid pressure may be exhausted tangentially from each end of the recess 82′ because of the clearance that would be established between the inner surface of the ring 80′ and the surface of the boss 22′. This leakage, however, does not result in a reduction of the static pressure acting in a radial direction since the amount of leakage is reduced in magnitude because of the minimum clearance that is provided.

The fluid leakage that is created while the clutch is applied is distributed to the torus circuit of the fluid torque converter and functions to supplement the normal converter torus flow through the feed passages.

In the embodiment of FIGURE 3, the recess 82 is formed with tangentially disposed shoulders which cooperate with the adjacent sides of the pad 84. The leakage then is reduced to a minimum degree.

By employing a clutch arrangement of this type, it is not necessary to make use of relatively complex clutch members or distribute clutch operating pressure to remote parts of the converter unit. Furthermore, by employing an auxiliary impeller blade assembly of this type, it is possible to support the radially outward auxiliary impeller without employing webs or spokes which extend through the torus circuit. Instead the blade elements 72 of the second auxiliary impeller section function as spokes for the first auxiliary impeller section.

Referring next to FIGURE 2, I have illustrated in schematic form the geometry of the blade elements of the converter unit. These blade elements are illustrated in cascade form by unwrapping the torus circuit.

It will be apparent from an inspection of FIGURE 2 that the effective impeller angle is determined by the angularity of the auxiliary impeller blades 72. As previously explained, these can be pivoted between two extreme positions that are determined by the stops 76 and 78. The blades are adjusted to provied a minimum shock loss condition. The angularity of the blades 72 is determined by the direction of the absolute fluid flow velocity vector at the entrance edge of the blades 72. This vector is determined by the stator blades 54.

As indicated, the exit angle for the stator blades 54 is shown at I′ and the flow velocity vector in a normal direction is shown at $F_o'$. The vector sum $V_o'$, which is equal to the flow $W_o'$ along the blades 54, is the absolute fluid flow velocity vector. The tangential component of this absolute fluid flow velocity vector is shown at $S_o$.

During operation in the performance range at low speed ratios, the vector $V_o'$ is substantially aligned with the absolute fluid flow velocity vector for a particle of fluid at the entrance edge of the blade 72. This vector is determined by the speed of rotation as measured by the vector $U_p$ and by the normal fluid flow $F_p$ at this point. The flow along the blade $W_p$ is aligned with the blade angle $\alpha_p$. The vector sum $V_p$ is the absolute fluid flow velocity vector and its direction is substantially the same as the vector $V_o'$.

During operation in the coupling range, the stator blades 54 free-wheel in the usual fashion. The direction of the absolute fluid flow velocity vector at the turbine exit region therefore determines the direction of the vector at the entrance edge of the blades 72.

Under these conditions, the absolute fluid flow velocity vector at the entrance region of the blades 54 will be in the direction indicated by the vector C. At stall, however, the corresponding vector is in the direction illustrated at D in FIGURE 2.

During operation of the mechanism at high speed ratios, it is necessary to vary the angularity of the auxiliary blades 72 in order that the absolute fluid flow velocity vector which exists at the region immediately preceding the blades 72 might be aligned with the absolute fluid flow velocity vector for a particle of fluid at the entrance region of the blade 72. This condition is illustrated also in FIGURE 2. The blade angle at the entrance section of the blade 72 is illustrated by the symbol $\alpha_c$ during operation in the high speed ratio operating range. The corresponding angle during low speed ratio operation, as previously indicated, is shown at $\alpha_p$. The vector sum of the rotational vector $U_c$, the flow along the blades $W_c$, and the normal flow $F_c$, is indicated by the vector $V_c$. Its direction is substantially the same as the direction of vector $V_p$. It will be apparent, therefore, that a minimum shock loss condition will be maintained.

During operation in the low speed ratio range, the angle $\alpha_p$ will be such that the vector sum $V_p$ will be substantially aligned with the vector $V_o'$. The vector representation for a particle of fluid at the exit region of the main impeller blades 18 also is shown in FIGURE 2. The direction of the absolute fluid flow velocity vector at this point is represented by the vector $v_o$. It is equal to the sum of the rotationel vector $u$, the flow along the blade $w_o$ and the normal flow $f_o$. The exit angle itself is represented by the symbol $\gamma$. The tangential component of the absolute fluid flow velocity vector is shown at $s_o$.

The difference in the magnitude of the moment of momentum at the exit section of the reactor and the exit region of the impeller blades 18 and the difference in the operating radii are a measure of the torque that is imparted to the fluid by the impeller 18. For any particle of fluid, the moment of momentum is equal to the mass of that particle multiplied by its operating radius times the tangential component of the absolute fluid flow velocity vector at that radius. During operation in the low speed ratio, high performance range, it will be apparent that the moment of momentum at the exit region of the impeller blades 18 will be substantially greater than the moment of momentum for the fluid that exists at the exit region of the stator blades 54.

By declutching the auxiliary impeller sections, the operating speed for any given speed ratio will be increased.

This will be accomplished by an increased toroidal fluid flow and a higher torque multiplication than would otherwise exist. To improve the coupling characteristics, however, the effective blade angle at the exit region of the impeller assembly should de decreased. This is done by clutching the auxiliary impeller sections in the manner previously described. Thus the exit angle $\gamma'$ for the blades 34 becomes the effective angle for the impeller assembly rather than the angle $\gamma$.

The rotational vector for a particle of fluid at the exit region of the blades 34 is shown at $u'$. The normal flow is shown at $f_o'$. The flow along the blades is shown at $w_o'$, and the vector sum is shown at $v_o'$. The tangential component of the absolute fluid flow velocity vector at this point is shown at $s_o'$. The difference between this vector and the corresponding tangential vector at the exit region of the stator blades, as well as the difference in a corresponding operating radii for these two regions, then is the measure of the torque that is developed by the impeller assembly.

The direction of the absolute fluid flow velocity vector at the entrance region of the turbine blades 42 at stall is shown at A. The corresponding vector at the coupling point is shown at B. The symbol $\zeta$ is used to designate speed ratio. The angle A designates the entrance angle for the plades 42. The corresponding entrance angle for the stator blades 54 is shown at A'.

During operation of the mechanism with the clutch disengaged, the auxiliary impeller sections rotate about the impeller boss. The rings 80 and 80' thus act as bearings under these conditions.

Having thus described a preferred embodiment of my invention, what I claim and desire to secure in United States Letters Patent is:

1. A hydrokinetic torque converter mechanism comprising a bladed main impeller, a turbine and a stator situated in toroidal fluid flow relationship, a first bladed auxiliary impeller section situated at a radially outward region of the torus circuit adjacent the flow exit edges of the main impeller blades, a second auxiliary impeller section situated at the flow entrance region of said main impeller blades, said auxiliary impeller sections being connected together for rotation in unison, a first hub carried by said auxiliary impeller sections, a second hub carried by said main impeller section, said hubs being concentrically disposed one within the other, and means for connecting together said hubs in frictional driving relationship whereby said main impeller and said auxiliary impeller sections rotate in unison, said connecting means comprising a controlled pressure line in the innermost one of said hubs, a pressure actuated element carried by said innermost hub, said element being movable radially outwardly under the influence of pressure in said pressure line into engagement with the surrounding surface of the outermost hub, said hubs being urged into frictional contact at a location spaced 180° away from said element with respect to the axis of said innermost hub as said element is pressurized, said second auxiliary impeller section having blades adjustably mounted for limited rotation with respect to said main impeller blades whereby the effective impeller entrance geometry is variable to provide a minimum shock loss condition.

2. A hydrokinetric torque converter unit comprising a bladed main impeller, a bladed turbine and a bladed stator situated in toroidal fluid flow relationship, an auxiliary impeller section located at the flow exit region of said main impeller, means for journalling said auxiliary impeller section for rotation relative to said main impeller, said journalling means comprising a first hub carried by said main impeller and a cooperating auxiliary hub surrounding said first hub, and fluid pressure operated means for connecting said hubs together in frictional driving relationship, said fluid pressure operated means comprising a controlled pressure in said first hub, a pressure actuated element carried by said first hub, said element being movable radially outwardly under the influence of pressure in said pressure line into engagement with the surrounding surface of said auxiliary hub, said hubs being urged into frictional contact at a location spaced 180° away from said element as said element is pressurized, said auxiliary impeller section having bades with a geometry that will direct the fluid flow from the main impeller blades in a tangential direction to increase the magnitude of the tangential fluid flow velocity vector in the direction of rotation of said impeller when said auxiliary impeller section is connected to said main impeller.

3. A hydrokinetic torque converter unit comprising a bladed main impeller, a bladed turbine and a bladed stator situated in toroidal fluid flow relationship, an auxiliary impeller section located at the flow exit region of said impeller, means for journalling said auxiliary impeller section for rotation relative to said main impeller, said journalling means comprising a first hub carried by said main impeller and a cooperating auxiliary impeller hub surrounding said first hub, fluid pressure operated clutch means for connecting said hubs together in frictional driving relationship, said clutch means comprising a recess formed in one impeller hub, a pressure pad situated in said recess and means for distributing fluid pressure to said pressure pad to urge the latter radially into engagement with the other hub thereby establishing frictional engagement between the cooperating surfaces of said hubs.

4. A hydrokinetic torque converter unit comprising a bladed main impeller, a bladed turbine and a bladed stator situated in toroidal fluid flow relationship, an auxiliary impeller section located at the flow exit region of main impeller, means for journalling said auxiliary impeller section for rotation relative to said main impeller, said journalling means comprising a first hub carried by said main impeller and a cooperating auxiliary impeller hub surrounding said first hub, fluid pressure operated clutch means for connecting said hubs together in frictional driving relationship, a web supporting said auxiliary impeller section at a radially outward region including a portion that traverses the inner torus circuit, said web portion being bladed to prevent interference with the toroidal fluid flow at the radially inward torus region, said clutch means comprising a recess formed in said first hub, a pressure pad situated in said recess and means for distributing fluid pressure to said pressure pad to urge the latter radially outwardly into engagement with the hub of said auxiliary impeller sections, thereby establishing frictional engagement between the cooperating surfaces of said hubs.

5. A hydrokinetic torque converter mechanism comprising a bladed main impeller, a turbine and a stator situated in toroidal fluid flow relationship, a first bladed auxiliary impeller section situated at a radiallly outward region of the torus circuit adjacent the flow exit edges of the main impeller blades, a second auxiliary impeller section situated at the flow entrance region of said main impeller blades, said auxiliary impeller sections being connected together for rotation in unison, a first hub carried by said auxiliary impeller sections, a second hub carried by said main impeller section, and clutch means for connecting together said hubs in frictional driving relationship whereby said main impeller and said auxiliary impeller sections rotate in unison, said clutch means comprising a recess formed in said main impeller hub, a pressure pad situated in said recess and means for distributing fluid pressure to said pressure pad to urge the latter radially outwardly into engagement with the hub of said auxiliary impeller sections, thereby establishing frictional engagement between the cooperating surfaces of said hubs.

6. A hydrokinetic torque converter mechanism comprising a bladed main impeller, a turbine and a stator situated in toroidal fluid flow relationship, a first bladed auxiliary impeller section situated at a radially outward region of the torus circuit adjacent the flow exit edges of the main impeller blades, a second auxiliary impeller section situated at the flow entrance region of said main impeller blades, said auxiliary impeller sections being connected together for rotation in unison, a first hub carried by said auxiliary impeller sections, a second hub carried by said main impeller section, clutch means for connecting together said hubs in frictional driving relationship whereby said main impeller and said auxiliary impeller sections rotate in unison, said second auxiliary impeller section having blades adjustably mounted for limited rotation with respect to said main impeller blades whereby the effective impeller entrance geometry is variable to provide a minimum shock loss condition, said clutch means comprising a recess formed in said main impeller hub, a pressure pad situated in said recess and means for distributing fluid pressure to said pressure pad to urge the latter radially outwardly into engagement with the hub of said auxiliary impeller sections, thereby establishing frictional engagement between the cooperating surfaces of said hubs.

7. A hydrokinetic troque converter unit comprising a bladed main impeller, a bladed turbine and a bladed stator situated in toroidal fluid flow relationship, an auxiliary impeller section located at the flow exit region of said impeller, means for journalling said auxiliary impeller section for rotation relative to said main impeller, said journalling means comprising a first hub carried by said main impeller and a cooperating auxiliary impeller hub surrounding said first hub, fluid pressure operated clutch means for connecting said hubs together in frictional driving relationship, said auxiliary impeller section having blades with a geometry that will direct the fluid flow from the main impeller blades in a tangential direction to increase the magnitude of the tangential fluid flow velocity vector in the direction of rotation of said impeller when said auxiliary impeller section is clutched to said main impeller, said clutch means comprising a recess formed in one impeller hub, a pressure pad situated in said recess and means for distributing fluid pressure to said pressure pad to urge the latter radially into engagement with the other hub thereby establishing frictional engagement between the cooperating surfaces of said hubs.

References Cited by the Examiner

UNITED STATES PATENTS

| | | | |
|---|---|---|---|
| 517,679 | 4/1894 | Byers | 192—88 |
| 2,093,281 | 9/1937 | Kreuser | 192—88 X |
| 2,440,825 | 5/1948 | Jandasek | 60—54 |
| 3,043,161 | 7/1962 | Tuck. | |
| 3,079,756 | 3/1963 | Farrell | 60—54 |

JULIUS E. WEST, *Primary Examiner.*